US008827863B2

(12) United States Patent
Poon et al.

(10) Patent No.: US 8,827,863 B2
(45) Date of Patent: Sep. 9, 2014

(54) PLANET CARRIER ARRANGEMENTS

(71) Applicant: Romax Technology Limited, Nottingham (GB)

(72) Inventors: Siu Yun Poon, Nottingham (GB); Paul James Gibbs, Bristol (GB); Liang Xu, Nottingham (GB)

(73) Assignee: Romax Technology Limited, Nottingham (GB)

( * ) Notice: Subject to any disclaimer, the term of this patent is extended or adjusted under 35 U.S.C. 154(b) by 0 days.

(21) Appl. No.: 13/669,836

(22) Filed: Nov. 6, 2012

(65) Prior Publication Data

US 2013/0116083 A1 May 9, 2013

(30) Foreign Application Priority Data

Nov. 7, 2011 (GB) .................................... 1119213.5
Nov. 7, 2011 (GB) .................................... 1119214.3
Nov. 8, 2011 (GB) .................................... 1119220.0

(51) Int. Cl.
*F16H 57/08* (2006.01)
*F16H 1/28* (2006.01)

(52) U.S. Cl.
CPC ................. *F16H 1/28* (2013.01); *F16H 57/082* (2013.01); *F05B 2260/40311* (2013.01)
USPC .......................................................... 475/331

(58) Field of Classification Search
CPC .................. F16H 2057/02078; F16H 2057/08; F16H 57/02
See application file for complete search history.

(56) References Cited

U.S. PATENT DOCUMENTS

| 6,929,578 | B1 * | 8/2005 | Rowell ........................... 475/331 |
| 7,384,360 | B2 * | 6/2008 | Ploetz et al. .................. 475/159 |
| 7,384,367 | B2 * | 6/2008 | Radinger et al. .............. 475/331 |
| 8,192,322 | B2 * | 6/2012 | Van Bogaert et al. ......... 475/331 |
| 8,298,115 | B2 * | 10/2012 | Ciszak et al. .................. 475/348 |
| 2006/0035746 | A1 * | 2/2006 | Griggs et al. .................. 475/331 |
| 2011/0142617 | A1 * | 6/2011 | Mashue et al. ................ 415/229 |
| 2011/0172053 | A1 * | 7/2011 | Chang ............................ 475/331 |

* cited by examiner

*Primary Examiner* — Dirk Wright

(57) ABSTRACT

A planet carrier 100 has a member 110 which is resistant to buckling caused by torsional stress and which increases a torsional stiffness of the planet carrier 100, so that a torsion load is transmitted evenly from the input member 120 into the planet pins 104 without twisting the planet carrier 100.

12 Claims, 8 Drawing Sheets

PLANET CARRIER ARRANGEMENTS

CROSS-REFERENCE TO RELATED APPLICATIONS

This application claims the benefit of U.K. Patent Application No. GB1119213.5 filed Nov. 7, 2011; GB1119214.3 filed Nov. 7, 2011; and GB1119220.0 filed Nov. 8, 2011.

BACKGROUND OF THE INVENTION

The present invention is related to planet carriers used in planetary gear systems, and in particular to planet carriers used in wind turbine gearboxes.

In a planetary gear system, the function of a carrier is to transmit torque or torsion load from the input shaft into the planet pins, as evenly as possible. Particularly in wind turbine applications, the carrier is also transmitting the weight of the gearbox back to the wind turbine rotor shaft. The most efficient way of doing this is a cylinder, but a planet carrier must have gaps for the planet gears. The gaps cause the shear to be concentrated in the legs. Flexibility of the planet carrier is critical to the alignment of the planet gear meshes.

These loads can cause deformation of the carrier, resulting in one or more of the following:
  Misalignment of the gear stage;
  Additional loads applied to the gearbox, due to overcoming the active range of the gearbox mountings; and
  Excessive vibration.

Approaches to increasing the stiffness of the carrier to avoid these problems have included:
  Thickening the carrier walls; and
  Adding ribs However, these approaches introduce further problems.
For example, thicker walls add weight.

Use of ribs can cause local stress raisers, which can cause fatigue failures. This is more of a problem in brittle materials, such as castings. Ribs also make for a more complex casting.

Excessive wind-up (where the downwind ends of the planet pins rotate relative to the upwind ends of the pins, about the central axis of the carrier) causes the planet pins to tilt, which in turn causes misalignment in the planet gear mesh. Carrier wind-up can also cause an imbalance of loading between the upwind and downwind planet bearings. Twisting of the pins in the bores in the carrier can cause excessive stress in the carrier (or pin), resulting in local yielding or fatigue failure.

Approaches to addressing these problems have included:
  Increasing the diameter of the planet pin interface with the carrier;
  Increasing the interference fit of the planet pin interface with the carrier;
  Shortening the length of the legs of the carrier;
  Increasing the thickness of the legs of the carrier;
  Changing the material of the carrier to a material having higher stiffness;
  Increasing the diameter of the carrier; and/or
  Increasing the thickness of the carrier plates.

However, there is a limit to the space available within the planet carrier. Increasing the pin diameter can cause assembly problems (e.g. carrier bearing seats may have channels cut into them to allow wider pins to be fitted—this reduces bearing life).

Increased interference fit causes greater stress in the region, increasing risk of yield or fatigue problems. Tighter fits also make assembling and disassembling more costly and risks of damage during assembly increase.

Shorter legs mean a thinner gear, which reduces the load carrying capacity or life of the gear.

Increasing the thickness of legs of carrier may only be possible if there is space between the planet gears to do so. Reducing the planet gear size reduces the ratio change of the planet stage. Thicker legs increase the weight of the carrier.

A change to a stiffer material would add cost in raw material, and may require more complex casting procedures (e.g. change from SG iron to cast steel)

Increasing the diameter of the carrier is only possible if there is space in the ring gear. An increase in ring gear size would result in a change in the overall package size of the gearbox.

Increasing the thickness of the plates results in a great increase in weight.

As mentioned above, the role or function of the planet carrier is to transmit torque loads and, particularly for wind turbine application, transmit the weight of the gear box.

Approaches to addressing this shortcoming include those illustrated in FIGS. 7 and 8. Referring to FIG. 7, which shows planet carrier 700 having a shaft 702, and which is supported by bearing 704 on the downwind side of the gearbox and by a very large bearing 706 on the upwind side. Large bearing 706 is able to pass over the input flange. However, large bearings are expensive, and as the carrier bearings are usually lightly loaded, a larger bearing further reduces the loading, with a concomitant increase in the risk of skidding failure in the bearing.

Referring now to FIG. 8, which shows planet carrier 700 having a shaft 702 supported by bearing 704 on the downwind side of the gearbox, smaller diameter support 706 can be used by splitting the carrier or the upwind bearing. Split bearings are unlikely to be reliable, and the use of a split carrier requires an additional joint, at a smaller size than that with the rotor shaft, which would be very highly loaded, difficult to manufacture and add cost.

As can be seen in FIGS. 7 and 8, planet carrier 700,800 is supported on the non-rotor side of the carrier by bearing 704,804 to provide the necessary radial support.

BRIEF SUMMARY OF THE INVENTION

The present invention has features designed to increase the stiffness of the carrier structure.

The invention uses a structurally significant extension to the leg in the axial direction, and strongly connects the legs on each side together. This reduces twisting of the legs on each side relative to the carrier plate. The invention places material at the outermost edge of the available space.

According to an aspect of the present invention, there is provided a planet carrier which is adapted to transmit a torsion load from an input member into a plurality of planet pins. The planet carrier has a first and second carrier plate, carrier legs disposed between the first and second carrier plates, and a member connected to the carrier legs and one of the carrier plates. The member is resistant to buckling caused by torsional stress and increases a torsional stiffness of the planet carrier, so that a torsion load is transmitted evenly from the input member into the planet pins without twisting the planet carrier.

Preferably, the member is a flange, rib or rim. Preferably the member is cylindrical or frustoconical. The depth of material in the plane of the loading determines the operational stiffness in this design.

Preferably, the member extends from the carrier legs to form a single kinematic structure comprising the legs and the member. Preferably, the carrier plates are connected to the assembly comprising the member and the legs. Preferably, the planet carrier additionally comprises planet pins, which are connected to the assembly comprising the member and the legs via the carrier plates. This means that torsion load is transmitted to the planet pins without twisting the carrier plate.

Preferably, the member extends from the carrier plate to form a single kinematic structure comprising the member and the carrier plate. This means that carrier plates can be thin, as they are not required to resist the bending generated in a prior art planet carrier.

Preferably, the assembly comprising the member and the carrier plate is connected to the carrier legs and twisting of the legs relative to the carrier plate is resisted. Preferably, the carrier legs comprise steel columns located between two carrier plates.

Preferably, the member is located around a periphery of the planet carrier. Preferably, the member is located radially inwardly of a periphery of the planet carrier, and places material at the edge of the available space. Preferably, the member is connected to the input member.

Preferably, the planet carrier additionally comprises a further member connected to the carrier legs and one of the carrier plates so that one member is located at one end of the planet carrier and the further member is located at the other end of the planet carrier. When two flanges are used, greater stiffness is achieved.

According to a further aspect of the present invention, there is provided a gearbox comprising the planet carrier described above.

According to a further aspect of the invention, a bearing arrangement for a planet carrier is provided, the bearing arrangement located on a shaft on one side of the carrier and adapted to react to tilting moments applied to the carrier. The arrangement also supports radial loads, such as gearbox mass and unbalanced loads from the gears.

Preferably, there are no bearings located on the other side of the carrier.

Preferably, the bearing arrangement comprises a pair of bearing means located adjacently on the shaft. The pair of bearing means may comprise a DTRB. The pair of bearing means may comprise a first bearing and a second bearing. The first bearing may be separated from the second bearing. The first bearing may be separated from the second bearing by a spacer.

According to a further aspect of the present invention, there is provided a wind turbine comprising the gearbox described above.

According to a further embodiment of the present invention, there is provided a member for a planet carrier comprising a first and second carrier plate and a plurality of carrier legs disposed between the first and second carrier plates. The member is adapted to connect to the carrier legs and one of the carrier plates, and is resistant to buckling caused by torsional stress. This means that, in use, the member increases a torsional stiffness of the planet carrier so that a torsion load is transmitted evenly from an input member into the planet pins without twisting the planet carrier.

Preferably, the member is a flange, rib or rim. Preferably the member is cylindrical or frustoconical. The depth of material in the plane of the loading determines the operational stiffness in this design.

Preferably, the member is additionally adapted to connect to either end of the planet carrier.

The present invention also provides a bearing arrangement which can be advantageously utilised with the planet carriers disclosed above.

DETAILED DESCRIPTION OF THE INVENTION

Figure 1:
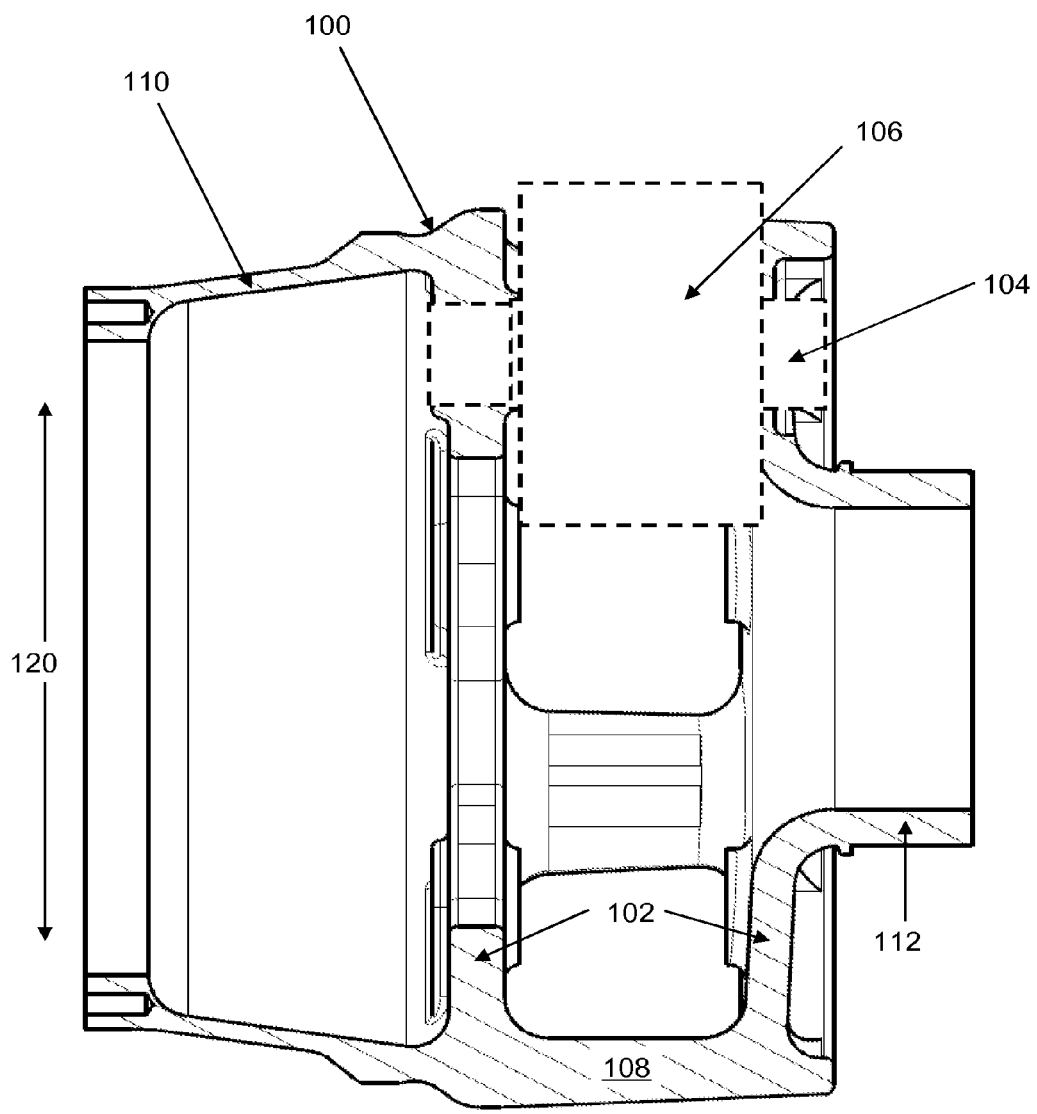
FIGS. 1 and 2 show sectional views of an embodiment of the planet carrier of the present invention, the former showing the location of planet pins and a planet gear, in which the member is frustoconical.

FIGS. 1-4 show a planet carrier 100 including carrier plates 102 that have holes or recesses 103 for planet pins 104 that support planet gear 106. The two carrier plates 102 are joined by legs 108. The function of planet carrier 100 is to transmit torsion load from an input member or shaft (which engages with planet carrier 100 as shown generally by arrow 120) into planet pins 104 as evenly as possible. Although the most efficient way of doing this is to employ a cylinder, planet carrier 100 must have gaps 105 for planet gears 106. Gaps 105 cause the shear to be concentrated in legs 108. In wind turbine applications, the input side of the planet carrier is the upwind direction, and the other side of the planet carrier, shown generally as 112, is in the down wind direction.

Figure 2:
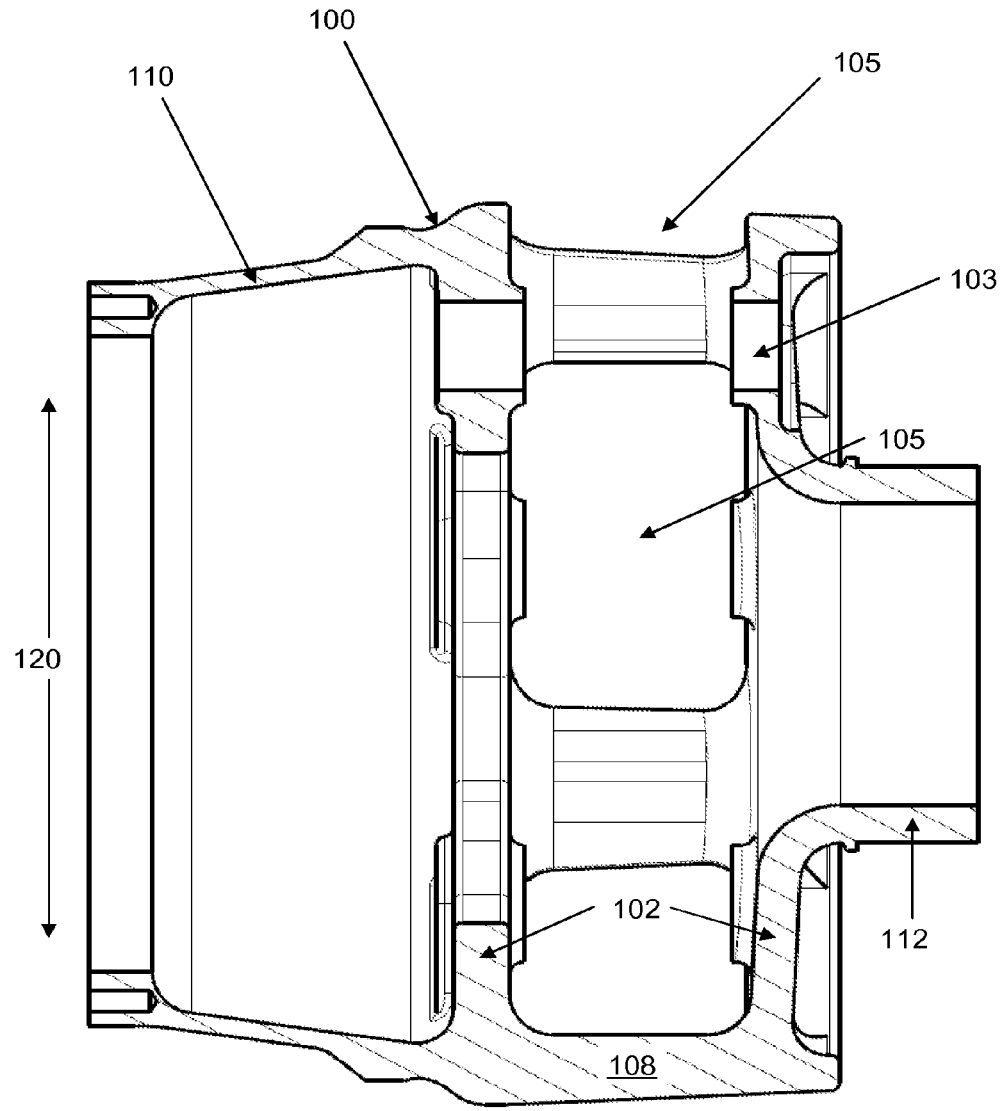
Figure 3:
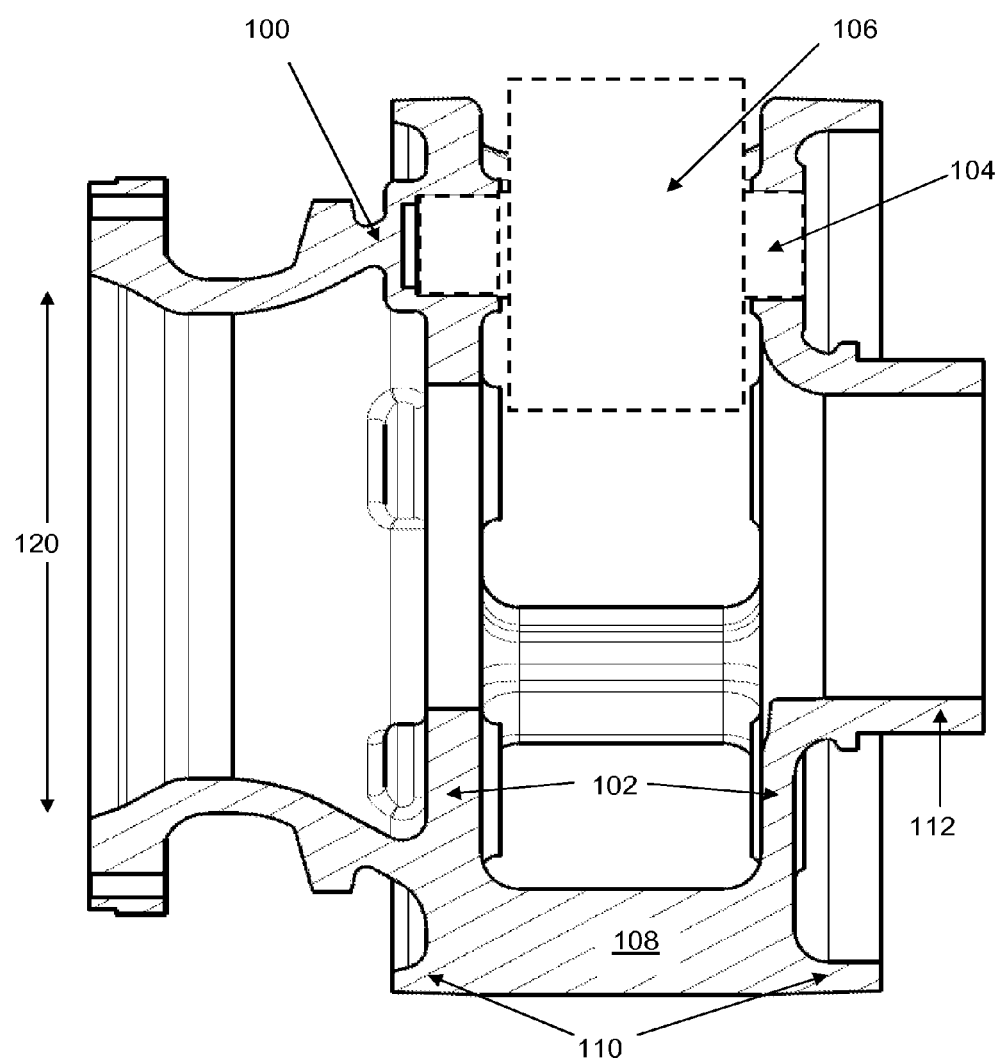
FIGS. 3 and 4 show sectional views of an embodiment of the planet carrier of the present invention, the former showing the location of planet pins and a planet gear, in which the member is a flange.
Figure 4:
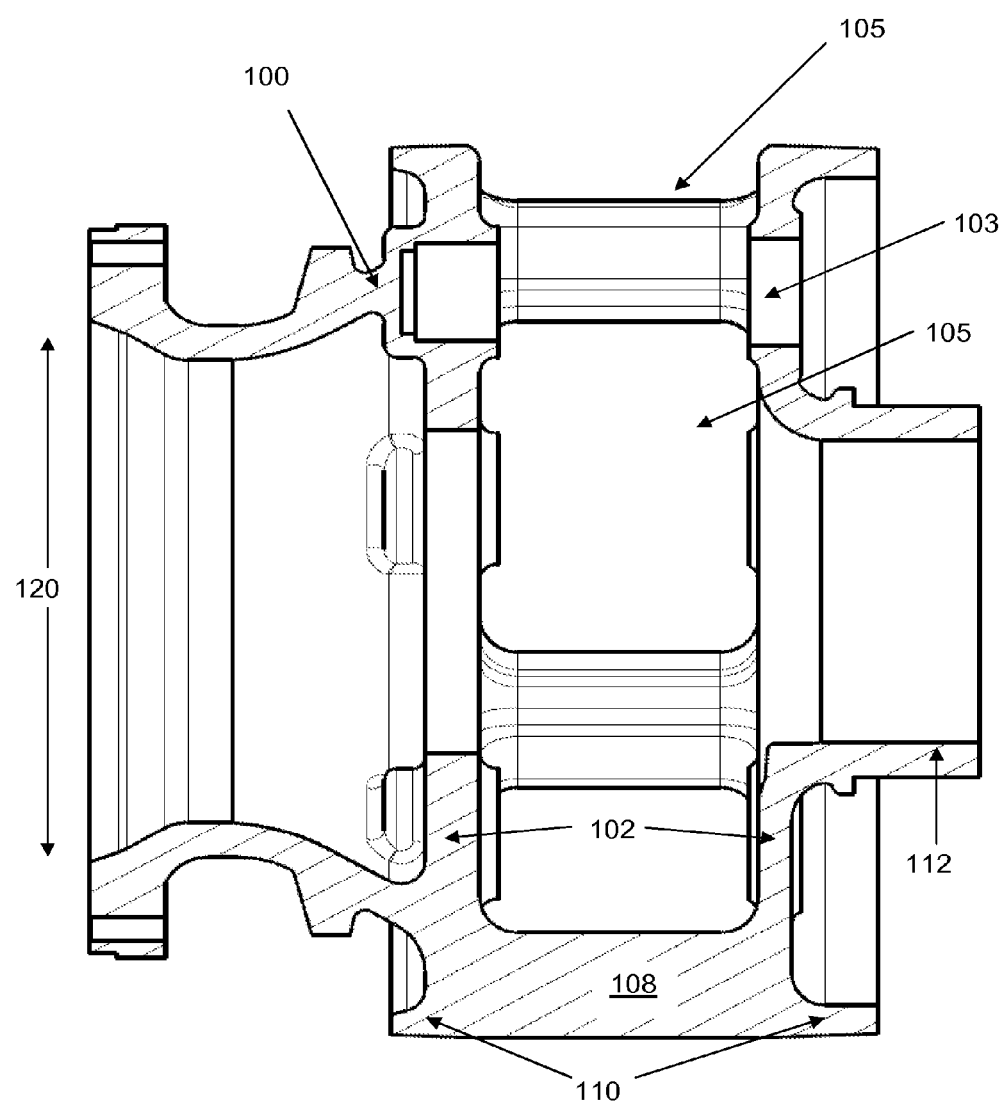
Figure 5A:
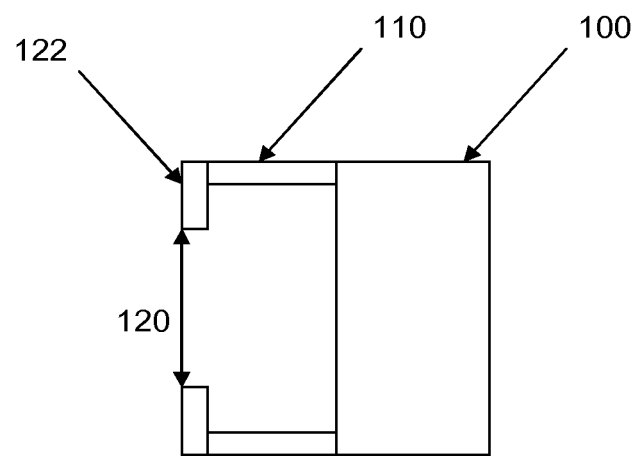
FIG. 5A shows a diagrammatic view of an embodiment of the planet carrier of the present invention, in which the member extending from the planet carrier legs towards the input shaft is cylindrical.
Figure 5B:
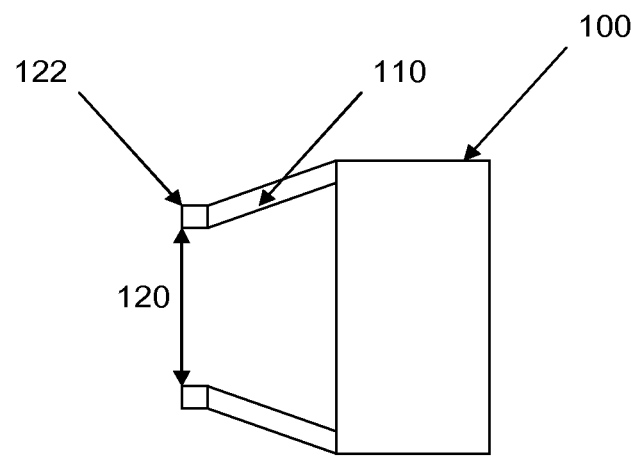
FIG. 5B shows a diagrammatic view of an embodiment of the planet carrier of the present invention, in which the member extending from the planet carrier legs towards the input shaft is conical.

In known designs, the function of carrier plates 102 is to hold planet pins 104 and transfer load from the planet carrier bearing to legs 108. The function of legs 108 is to join carrier plates 102 together The present invention provides a structurally significant extension to legs 108 in the form of a member 110 extending axially away from the carrier, and strongly connects legs 108 together, forming a single kinematic structure. This stiffens the structure of planet carrier 100 and reduces twisting of legs 110 on each side relative to carrier plate 102. Member 110 extends from the planet carrier legs 108 towards the input shaft 120. The member can be a frustoconical (as shown in FIGS. 1, 2 and 5B) or cylindrical tube (as shown in FIG. 5A) or flange, rib or rim 110 (as shown in FIGS. 3 and 4).

Planet pins 104 are connected to the member/leg structure 108/110 via carrier plates 102. Thus carrier plate 102 holding planet pins 104 is effectively immobilised between the very stiff leg 108 and rib/flange 110 structure. The function of flange 110 is to stiffen carrier plate 102 and connect legs 108 together, so it is most effective when it is connected directly to legs 108.

Member 110 anchors leg 108 to carrier plate 102, and legs 108 to each other. Member 110 is part of the structure that makes up the legs 108 which means that functionally legs 108 are not discrete components as they are now strongly interconnected.

Member 110 can be formed at either or both axial ends of planet carrier 100. Member 110 need not be located at the edge of the plate (could be inside the edge).

A thickness of member 110 in the radial direction only needs to be big enough to prevent buckling, which means member 110 is a lightweight structure. Carrier plates 102 can be thin, as they are not required to resist the bending generated in a prior art planet carrier 100.

Although maximum resistance to shear loads and bending (both in the vertical plane and in torsion) comes from a 0 degree cone, which is a cylinder, it is the depth of material in the plane of the loading that determines the operational stiffness in this design.

To obtain the greatest increase in stiffness, flange 110 is a feature of both axial ends of planet carrier 100, as shown in the Figures. In a further embodiment, legs 108 can be separate steel columns sandwiched between two carrier plates 102 (with a bolt down the middle), and flange 110 is part of carrier plate 102 and stiffens the plate.

In FIGS. 1-4, member 110 is shown as being integral with carrier plate 102 and legs 108. It is to be understood that member 110 may be a discrete component, as shown diagrammatically in FIGS. 3a and 3B, which may be attached to the planet carrier.

Thus the present invention also includes a member for a planet carrier which is adapted to connect to the carrier legs and one of the carrier plates, and is resistant to buckling caused by torsional stress. This means that, in use, the member increases a torsional stiffness of the planet carrier so that a torsion load is transmitted evenly from an input member into the planet pins without twisting the planet carrier.

Referring to FIG. 3A, which shows a cylindrical member 110, a flat plate 122 is required to complete the connection to the output shaft, and flat plate 122 would have a relatively high flexibility. Referring to FIG. 3B, which shows a frustoconical member 110, the end nearest output shaft 120 has a smaller diameter, which means that flat plate 122 is of smaller diameter, or may not be required. Thus although the cylinder itself would be stiffer, the frustoconical arrangement is a better idea because flat plate 122 is smaller or not needed.

Figure 6:
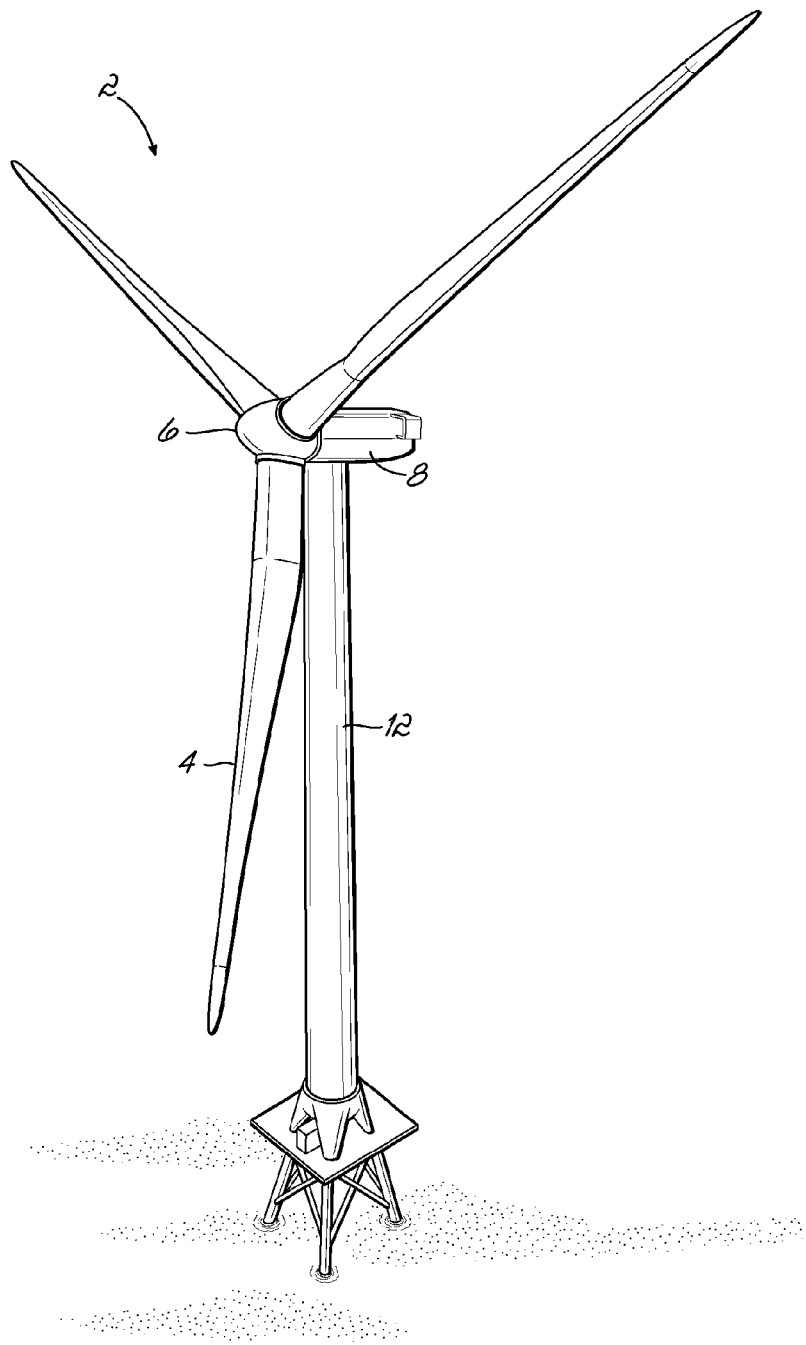
FIG. 6 is a perspective view of one example of a wind turbine.
Figure 7:
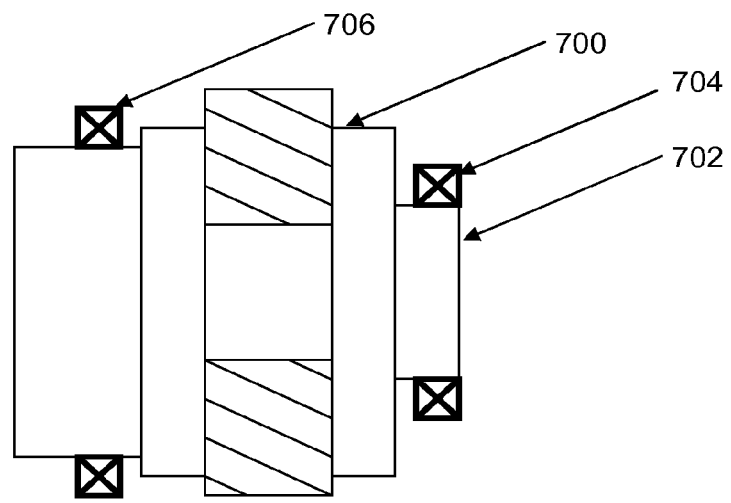
FIG. 7 (prior art) shows a large bearing used to support a planet carrier.
Figure 8:
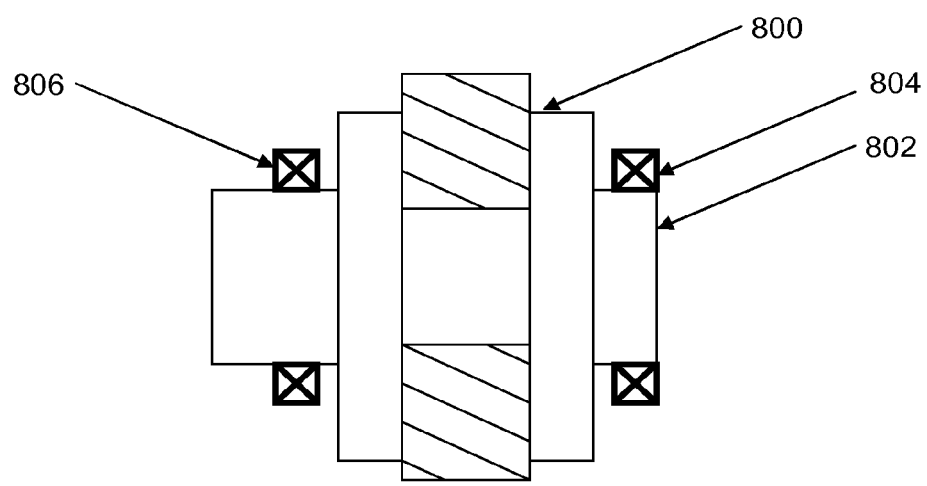
FIG. 8 (prior art) shows a split bearing/split carrier arrangement to support a planet carrier.

The present invention also includes a gearbox comprising the planet carrier, and a wind or water turbine comprising the gearbox. FIG. 6 shows one example of a wind turbine 2. Although an offshore wind turbine is shown, it should be noted that the description below may be applicable to other types of wind turbines. The wind turbine 2 includes rotor blades 4 mounted to a hub 6, which is supported by a nacelle 8 on a tower 12. Wind causes the rotor blades 4 and hub 6 to rotate about a main axis. This rotational energy is delivered to a gearbox housed within the nacelle 8.

The bearing arrangement for a planet carrier includes any arrangement providing a reaction to tilting moments and which is located on one side of the carrier, there being no further bearing arrangements located on the other side of the carrier. In a wind turbine gearbox, for example, one side would be the upwind side and one side would be the downwind side. The bearing arrangement would be located at the downwind side, and there would be no bearings at the upwind side. For other gearboxes, one side would be an input side and the other side would be an output side.

Figure 9:
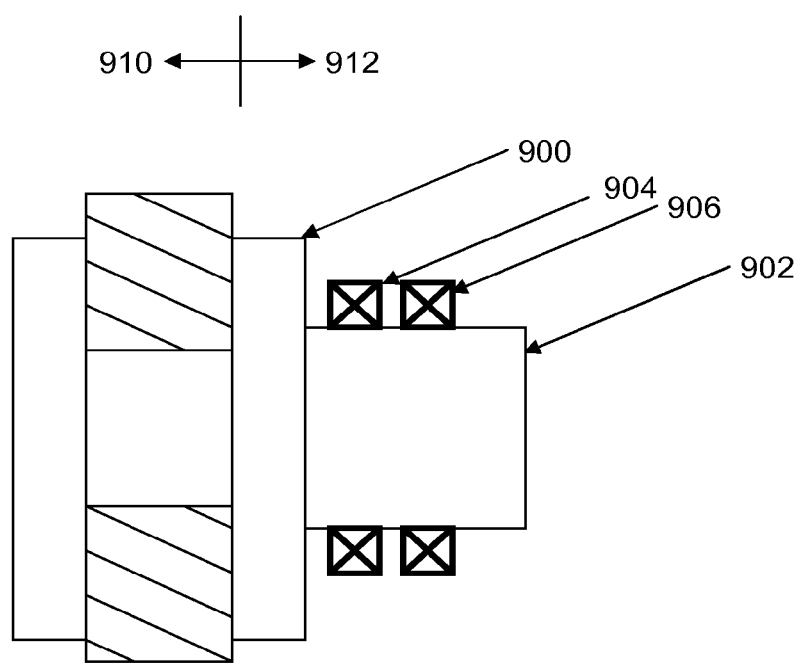
FIG. 9 shows a diagrammatic view of an embodiment of the planet carrier bearing arrangement of the present invention.

Referring to FIG. 9, which shows planet carrier 900 having shaft 902 supported by a first support 904, and a second support 906 positioned on shaft 902 adjacent first support 904. The planet carrier has two ends or sides indicated by the directions 910 and 912 respectively. In a wind turbine gearbox, one end 910 is the upwind side, and the other end 912 is the downwind side; thus first support 904 and second support 906 are located at the downwind side 912 of the carrier; there are no bearings or supports at the upwind side 910. This arrangement, having two points of support, provides a reaction to tilting moments applied to the carrier, and also supports radial loads including gear box mass and unbalanced loads from the gears.

The planet carrier shown in FIG. 9 corresponds to the diagrammatic form of planet carrier shown in FIG. 5A and includes the planet carriers disclosed in FIGS. 1-4 and 5B.

The key feature of bearing arrangement formed by the first support 904 and the second support 906 is that there is an arrangement on the downwind end that can react a moment. The support pair can be side-by side, in which there is no separation between them, or as two units, which could have a small spacer located between them.

The bearing arrangement of the present invention includes a pair of bearing means, such as first support 904 and second support 906, which are typically located between a 1st or 2nd stage planet carrier 900 and a gearbox housing (not shown). As they are located on the smaller diameter end of the carrier, they can be small and easily fitted. Double- or two-row tapered roller bearings (DTRB) can be used if additional stiffness is required. Thermal variation in preload of the bearings is also reduced by the use of smaller bearings.

In the foregoing, the bearing arrangement has been described as being comprised of a pair of bearing means, the bearing arrangement also includes any arrangement providing a reaction to tilting moments. For example, an arrangement in which there are two bearing elements interspaced with each other, so that although the arrangement has, in effect, one row of bearings, alternate rollers are supporting diagonally opposite parts of the race. Such an arrangement could have cylindrical rollers, but behaves like a DTRB. Thus the bearing arrangement is not limited to a pair of bearing means.

The present invention also includes a planet carrier comprising the bearing arrangement as disclosed in the foregoing.

The invention claimed is:

1. A planet carrier adapted to transmit a torsion load from an input member into a plurality of planet pins, said planet carrier comprising:
   a first and second carrier plate;
   a plurality of carrier legs disposed between said first and second carrier plates;
   and a member connected to said carrier legs and one of said carrier plates;
   wherein said member is resistant to buckling caused by torsional stress and increases a torsional stiffness of said planet carrier, whereby a torsion load is transmitted evenly from said input member into said planet pins without twisting said planet carrier, wherein said member extends axially away from said carrier, wherein said member is frustoconical in shape, and wherein said member is located around a periphery of said planet carrier.

2. The planet carrier according to claim 1, wherein said member comprises a flange, rib or rim.

3. The planet carrier according to claim 2, wherein said member extends from said carrier legs to form a single kinematic structure comprising said legs and said member.

4. The planet carrier according to claim 3, wherein said carrier plates are connected to said assembly comprising said member and said legs.

5. The planet carrier according to claim 4, additionally comprising a plurality of planet pins, wherein said planet pins are connected to said assembly comprising said member and said legs via said carrier plates, wherein torsion load is transmitted to said planet pins without twisting said carrier plate.

6. The planet carrier according to claim 4, wherein said member extends from said carrier plate to form a single kinematic structure comprising said member and said carrier plate.

7. The planet carrier according to claim 6, wherein said assembly comprising said member and said carrier plate is connected to said carrier legs and twisting of said legs relative to said carrier plate is resisted.

8. The planet carrier according to claim 7, wherein said carrier legs comprise columns located between two carrier plates.

9. The planet carrier according to claim 1, wherein said member is connected to said input member.

10. The planet carrier according to claim 1, additionally comprising a further member connected to said carrier legs and one of said carrier plates, wherein said member is located at one end of said planet carrier and said further member is located at an other end of said planet carrier.

11. A gearbox comprising said planet carrier of claim 1.

12. A wind turbine comprising said gearbox according to claim 11.

\* \* \* \* \*